United States Patent
Okajima

(10) Patent No.: US 7,708,954 B2
(45) Date of Patent: May 4, 2010

(54) NITROGEN OXIDES PURIFICATION DEVICE

(75) Inventor: Masahiro Okajima, Kariya (JP)

(73) Assignee: Denso Corporation, Kariya (JP)

( * ) Notice: Subject to any disclaimer, the term of this patent is extended or adjusted under 35 U.S.C. 154(b) by 973 days.

(21) Appl. No.: 11/336,824

(22) Filed: Jan. 23, 2006

(65) Prior Publication Data

US 2007/0059227 A1    Mar. 15, 2007

(30) Foreign Application Priority Data

Jan. 25, 2005  (JP)  .............. 2005-016973

(51) Int. Cl.
*B01D 50/00*   (2006.01)
(52) U.S. Cl. ..................................... 422/177
(58) Field of Classification Search .............. 422/167, 422/177, 180, 175; 110/345
See application file for complete search history.

(56) References Cited

U.S. PATENT DOCUMENTS

| | | | |
|---|---|---|---|
| 2,237,468 A * | 4/1941 | Baker | 196/116 |
| 4,678,643 A | 7/1987 | Fetzer | |
| 5,237,939 A * | 8/1993 | Spokoyny et al. | 110/345 |
| 6,935,105 B1 | 8/2005 | Page et al. | |
| 7,386,977 B2 | 6/2008 | Ancimer et al. | |
| 2005/0223699 A1 | 10/2005 | Ancimer et al. | |
| 2005/0252202 A1 | 11/2005 | Page et al. | |
| 2005/0257516 A1 | 11/2005 | Ancimer et al. | |
| 2006/0053776 A1 | 3/2006 | Ancimer et al. | |
| 2008/0236146 A1 | 10/2008 | Ancimer et al. | |

FOREIGN PATENT DOCUMENTS

| | | |
|---|---|---|
| EP | 1 541 952 | 6/2005 |
| JP | 3015777 | 12/1999 |
| JP | 2002-38935 | 2/2002 |
| WO | WO 2004/031546 | 4/2004 |

OTHER PUBLICATIONS

Japanese Office Action dated Nov. 17, 2009, issued in corresponding Japanese Application No. 2005-016973, with English translation.

* cited by examiner

*Primary Examiner*—Tom Duong
(74) *Attorney, Agent, or Firm*—Nixon & Vanderhye PC

(57) ABSTRACT

A nitrogen oxides purification device has an exhaust gas heating section and a nitrogen oxides purification section. The exhaust gas heating section has a fuel injection device and a catalytic metal. The nitrogen oxides purification device is provided in a heat exchanger having a downstream exhaust gas flow passage located downstream of the nitrogen oxides purification section and an upstream exhaust gas flow passage located upstream of the exhaust gas heating section. Exhaust gas heated at the exhaust gas heating section flows through the downstream exhaust gas flow passage. The exhaust gas to be heated at the exhaust gas heating section flows through the upstream exhaust gas flow passage. Heat is transferred between the downstream and upstream exhaust gas flow passages. The nitrogen oxides purification device operates at low fuel consumption.

4 Claims, 3 Drawing Sheets

NITROGEN OXIDES PURIFICATION DEVICE

CROSS REFERENCE TO RELATED APPLICATION

This application is based on and incorporates herein by reference Japanese Patent Application No. 2005-16973 filed on Jan. 25, 2005.

BACKGROUND OF THE INVENTION

1. Field of the Invention

The present invention relates to a nitrogen oxides purification device, in particular, to a nitrogen oxides purification device improving fuel consumption.

2. Description of Related Art

Exhaust gas discharged from an internal combustion engine of an automobile and the like contains components such as carbon monoxide (CO), hydrocarbon (HC), nitrogen oxides (NOx), or particulate matters (PM). Reduction of these components has been considered.

In order to reduce these components, a lean-burn system that reduces the amounts of these components discharged from the engine by performing an operation with a lean air-fuel mixture may be employed or a method of decomposing and purifying these components contained in the exhaust gas into harmless components with the use of a catalyst such as a noble metal may be employed. The lean-burn system reduces a production of the harmful components. Usually, the lean-burn system also uses a catalyst to decompose and purify the harmful components.

The automobile engines can be generally categorized into gasoline engines running on gasoline and diesel engines running on diesel oil. It is known that the diesel engine discharges a larger quantity of the particulate matters than the gasoline engine. Usually, the particulate matters are trapped with a filter catalyst such as a diesel particulate filter and are eliminated from the exhaust gas.

The lean-burn system increases an air-fuel ratio (A/F ratio) from a stoichiometric air-fuel ratio. Thus, the lean-burn system reduces a fuel injection quantity to reduce the harmful components discharged from the engine. The lean-burn system reduces an environmental load by reducing the harmful components discharged from the engine. The lean-burn system has been employed in the diesel engine in addition to the gasoline engine.

Usually, the vehicle has a catalyst device using a noble metal such as an oxidation catalyst, a reduction catalyst or a three-way catalyst to decompose and purify the above-mentioned components. Decomposition and purification of the carbon monoxide and the hydrocarbon are advanced by an oxidation reaction, and decomposition and purification of the nitrogen oxides are advanced by a reduction reaction.

Particularly in the diesel engine, the harmful components are eliminated by a catalytic metal after the particulate matters are eliminated by a filter catalyst. Therefore, there is a possibility that temperature of the exhaust gas becomes lower than activation temperature of the catalytic metal when the exhaust gas is purified by the catalytic metal. The harmful components cannot be purified by the catalytic metal if the exhaust gas temperature becomes low.

Therefore, nitrogen oxides purification devices for decomposing and purifying the nitrogen oxides contained in the exhaust gas have been developed. A certain nitrogen oxides purification device has a fuel injection device, platinum (catalytic metal) located downstream of the fuel injection device, and a nitrogen oxides purification catalyst located downstream of the platinum. The fuel injection device injects the fuel of the engine into the exhaust gas containing the nitrogen oxides. This nitrogen oxides purification device injects the fuel into the exhaust gas and decomposes the fuel with the platinum located downstream. Thus, the nitrogen oxides purification device increases the temperature of the exhaust gas and the nitrogen oxides purification catalyst with heat, which is generated in the progress of the decomposition reaction, over the temperature enabling exertion of the catalytic activation. Thus, the nitrogen oxides purification device decomposes and purifies the nitrogen oxides.

However, this type of nitrogen oxides purification device has to consecutively inject the fuel into the exhaust gas during the operation of the engine. As a result, fuel consumption is increased.

SUMMARY OF THE INVENTION

It is an object of the present invention to provide a nitrogen oxides purification device that injects fuel into exhaust gas, reducing fuel consumption.

A nitrogen oxides purification device of the present invention has an exhaust gas heating section and a nitrogen oxides purification section. The exhaust gas heating section has a fuel injection device for injecting fuel into exhaust gas containing nitrogen oxides and a catalytic metal located downstream of a position, where the fuel injection device injects the fuel, for oxidizing and decomposing the fuel. The nitrogen oxides purification section has a nitrogen oxides purification catalyst located downstream of the exhaust gas heating section for purifying the nitrogen oxides. The nitrogen oxides purification device is provided in a heat exchanger having a downstream exhaust gas flow passage, which is located downstream of the nitrogen oxides purification section, and an upstream exhaust gas flow passage, which is located upstream of the exhaust gas heating section. The exhaust gas heated at the exhaust gas heating section flows through the downstream exhaust gas flow passage. The exhaust gas to be heated at the exhaust gas heating section flows through the upstream exhaust gas flow passage. The heat exchanger is structured such that heat can be transferred between the downstream exhaust gas flow passage and the upstream exhaust gas flow passage.

The nitrogen oxides purification device of the present invention is provided in the heat exchanger having the downstream exhaust gas flow passage, through which the exhaust gas heated at the exhaust gas heating section flows, and the upstream exhaust gas flow passage, through which the exhaust gas to be heated at the exhaust gas heating section flows. Since the heated exhaust gas flows into the exhaust gas heating section, a heat amount applied to the exhaust gas at the exhaust gas heating section is reduced. Accordingly, the fuel injected into the exhaust gas at the exhaust gas heating section can be reduced. As a result, the nitrogen oxides purification device can be operated at low fuel consumption.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
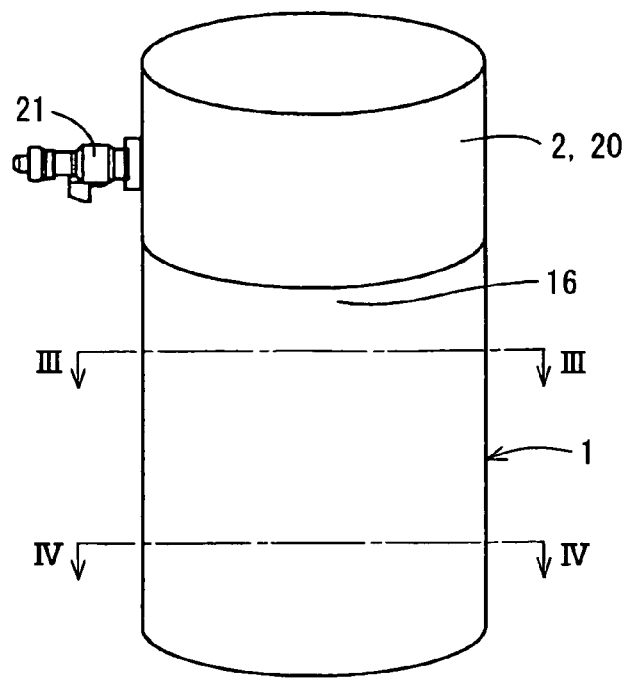
FIG. 1 is a view showing a structure of a nitrogen oxides purification device according to an example embodiment.

A nitrogen oxides purification device of the present invention has an exhaust gas heating section and a nitrogen oxides purification section. The exhaust gas heating section has a fuel injection device and a catalytic metal. The fuel injection device injects fuel into exhaust gas containing nitrogen oxides. The catalytic metal is located downstream of a position, where the fuel injection device injects the fuel, for oxidizing and decomposing the fuel. The nitrogen oxides purification section has a nitrogen oxides purification catalyst located downstream of the exhaust gas heating section for purifying the nitrogen oxides.

The nitrogen oxides purification device of the present invention heats the exhaust gas at the exhaust gas heating section having the fuel injection device and the catalytic metal. The nitrogen oxides purification device heats the nitrogen oxides purification section downstream of the exhaust gas heating section with the exhaust gas. Thus, the nitrogen oxides purification device decomposes and purifies the nitrogen oxides contained in the exhaust gas.

The nitrogen oxides purification device of the present invention is provided in a heat exchanger, in which heat can be transferred between a downstream exhaust gas flow passage and an upstream exhaust gas flow passage. The downstream gas flow passage and the upstream exhaust gas flow passage are provided in a single-piece heat exchanger. Accordingly, the both flow passages can exchange the heat. In the heat exchanger, heat of the heated exhaust gas flowing through the downstream exhaust gas flow passage is transferred to the exhaust gas flowing through the upstream exhaust gas flow passage. As a result, the temperature of the exhaust gas flowing into the exhaust gas heating section is high. Therefore, a heat amount necessary to heat the exhaust gas, i.e., a heat amount applied to the exhaust gas, at the exhaust gas heating section is small. This indicates that the fuel injected into the exhaust gas at the exhaust gas heating section can be reduced. Accordingly, the nitrogen oxides purification device of the present invention can be operated at low fuel consumption.

The exhaust gas heating section and the nitrogen oxides purification section of the nitrogen oxides purification device of the present invention are not limited specifically as long as the exhaust gas heating section and the nitrogen oxides purification section are provided by devices or members capable of exerting the above-described functions. Devices similar to conventional and known devices may be employed.

A device capable of injecting the fuel into the exhaust gas containing the nitrogen oxides discharged from an internal combustion engine may be employed as the fuel injection device. The method of injecting the fuel into the exhaust gas is not limited.

The fuel injected by the fuel injection device into the exhaust gas is not limited specifically as long as the fuel generates heat when the fuel is decomposed by the catalytic metal. A low hydrocarbon compound can be employed as the fuel. The fuel of the engine should be preferably used as the fuel injected by the injection device because no additional tank for storing the fuel is necessary and the fuel to be injected can be replenished at the same time as the fuel of the engine.

The catalytic metal is located downstream of the position, where the fuel injection device injects the fuel, with respect to a flow direction of the exhaust gas. Since the catalytic metal is located downstream of the position where the fuel injection device injects the fuel, the exhaust gas, into which the fuel is injected, contacts the catalytic metal.

The catalytic metal oxidizes and decomposes the fuel. The oxidation reaction of the fuel advanced by the catalytic metal is an exothermic reaction. The heat generated in the exothermic reaction heats the exhaust gas. For example, a decomposition reaction of the fuel consisting of hydrocarbon is shown by a following expression (1).

$$C_mH_n + O_2 \rightarrow CO_2 + H_2O, \tag{1}$$

The catalytic metal of the nitrogen oxides purification device of the present invention is not limited specifically as long as the catalytic metal can oxidize and decompose the fuel to generate the heat. For example, platinum can be used as the catalytic metal.

The nitrogen oxides purification section is located downstream of the exhaust gas heating section. The exhaust gas heated at the exhaust gas heating section flows into the nitrogen oxides purification section. The heated exhaust gas heats the nitrogen oxides purification section over predetermined temperature, enabling purification of the nitrogen oxides contained in the exhaust gas. The exhaust gas flowing into the nitrogen oxides purification section also contains the fuel that is not decomposed at the exhaust gas heating section. In the case where the fuel is the hydrocarbon, the fuel that is not decomposed (fuel that is not oxidized completely) functions as a reaction source of the reduction reaction in the nitrogen oxides purification. That is, a reaction indicated by a following expression (2) progresses.

$$C_mH_n + NO_x \rightarrow CO_2 + H_2O + N_2, \tag{2}$$

The nitrogen oxides purification section is not limited specifically as long as a device capable of purifying the nitrogen oxides is employed as the nitrogen oxides purification section. For example, a porous support made of a heat-resistant inorganic oxide may be formed on a surface of a catalyst support base material made of heat-resistant ceramics or heat-resistant metal, and a catalytic metal such as a noble metal may be supported on a surface of the support. Silver, copper, or manganese may be employed as the catalytic metal for purifying the nitrogen oxides, for example.

The structure and the like of the heat exchanger of the nitrogen oxides purification device of the present invention are not limited specifically as long as the downstream exhaust gas flow passage and the upstream exhaust gas flow passage are integrated with each other such that the heat can be transferred therebetween. For example, the upstream exhaust gas flow passage and the downstream exhaust gas flow passage should be preferably integrated such that the upstream exhaust gas flow passage and the downstream exhaust gas flow passage are separated by a partition wall made of a material such as a metal capable of exchanging the heat. A contact area between the upstream exhaust gas flow passage and the downstream exhaust gas flow passage should be preferably wide. That is, the heat exchanger should be preferably provided with multiple downstream cells providing the downstream exhaust gas flow passage and multiple upstream cells providing the upstream exhaust gas flow passage such that the downstream cells and the upstream cells are adjacent to each other.

The heat exchanger should preferably have the nitrogen oxides purification section. If the heat exchanger has the nitrogen oxides purification section, the heat exchange can be performed at a position closer to the exhaust gas heating section. Accordingly, the exhaust gas flowing through the upstream exhaust gas flow passage can be heated to higher temperature.

The nitrogen oxides purification device of the present invention exerts the effect in the purification of the exhaust gas of the internal combustion engine that discharges the nitrogen oxides. The type of the engine is not limited. The engine should be preferably the diesel engine, and the fuel should be preferably the diesel oil.

The nitrogen oxides purification device of the present invention should preferably have a sensor for sensing the exhaust gas flowing through the respective exhaust gas flow passages, a calculation device for calculating the fuel quantity injected by the fuel injection device based on the sensing signal of the sensor, and a control device for controlling the fuel injection of the fuel injection device based on the calculation result of the calculation device. The fuel injection is controlled based on the sensing result of the sensor. Accordingly, excess fuel injection into the exhaust gas can be prevented, and the increase of the fuel consumption amount of the entire device can be inhibited. Thus, the fuel consumption can be improved. A sensor for measuring a state of the exhaust gas flowing into the nitrogen oxides purification device or temperature or contents of the constituents of the exhaust gas discharged from the nitrogen oxides purification device may be employed as the sensor. The sensor may be attached directly to the heat exchanger. Alternatively, an oxygen sensor or the like, which is attached to the vehicle beforehand, may be used.

Next, an example embodiment of the present invention will be explained.

Figure 2:
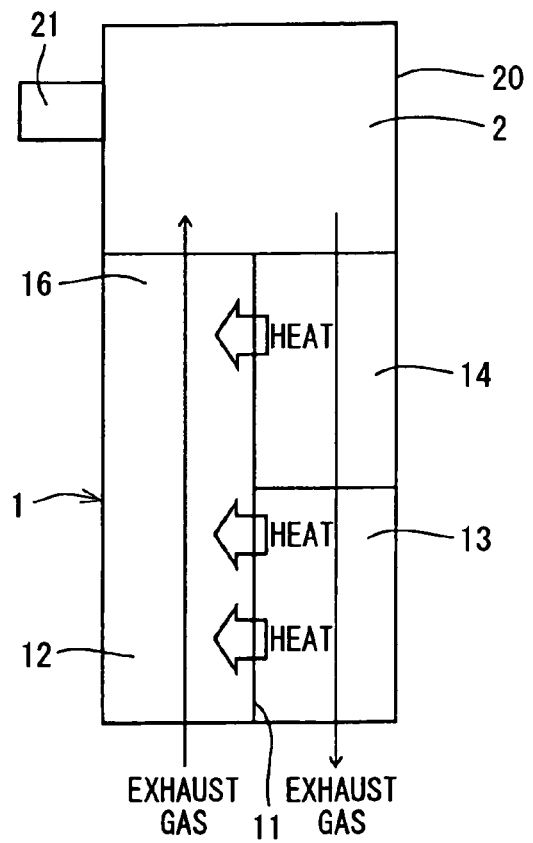
FIG. 2 is a diagram showing the structure of the nitrogen oxides purification device according to the example embodiment.
Figure 3:
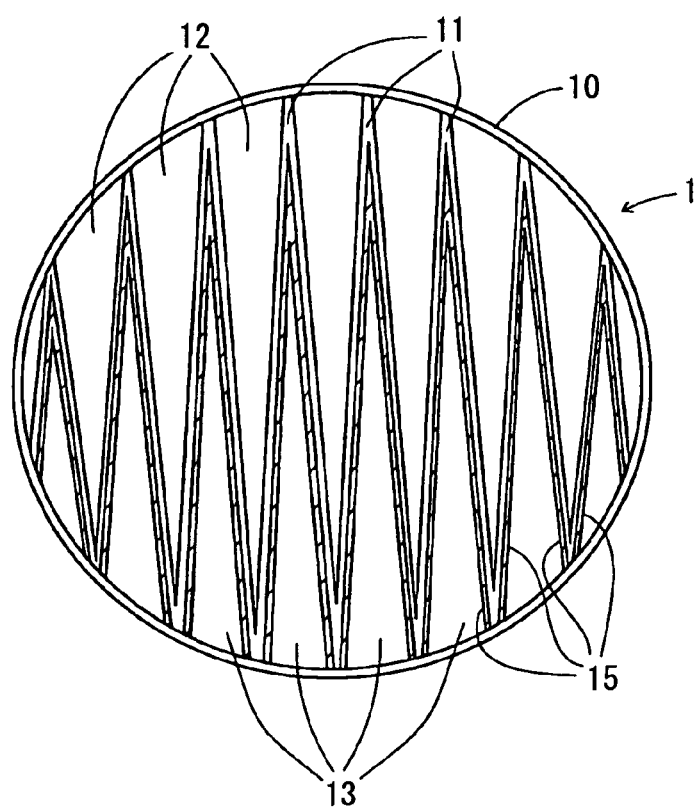
FIG. 3 is a cross-sectional view showing a heat exchanger of the nitrogen oxides purification device according to the example embodiment.
Figure 4:
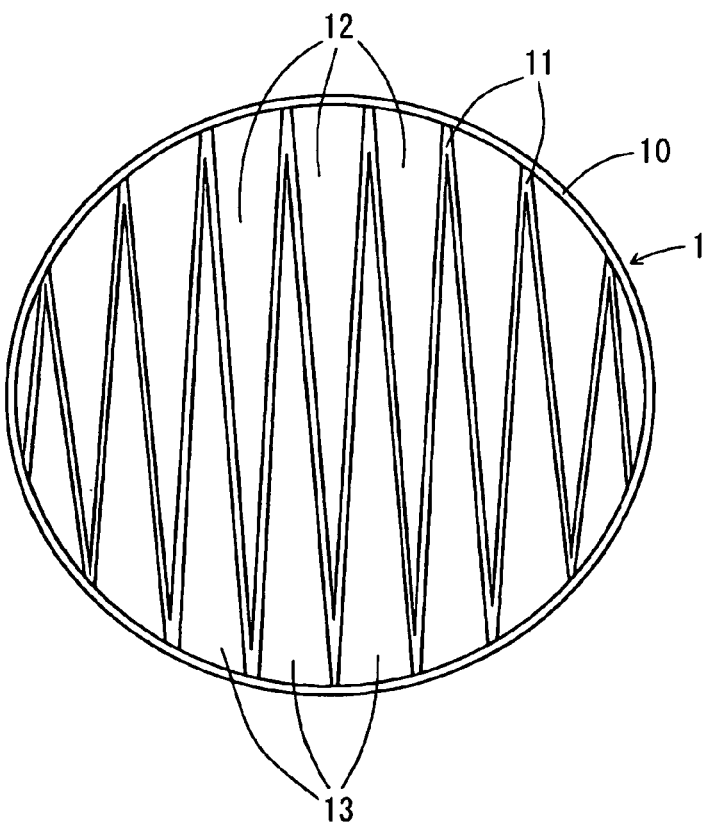
FIG. 4 is a cross-sectional view showing the heat exchanger of the nitrogen oxides purification device according to the example embodiment.
Figure 5:
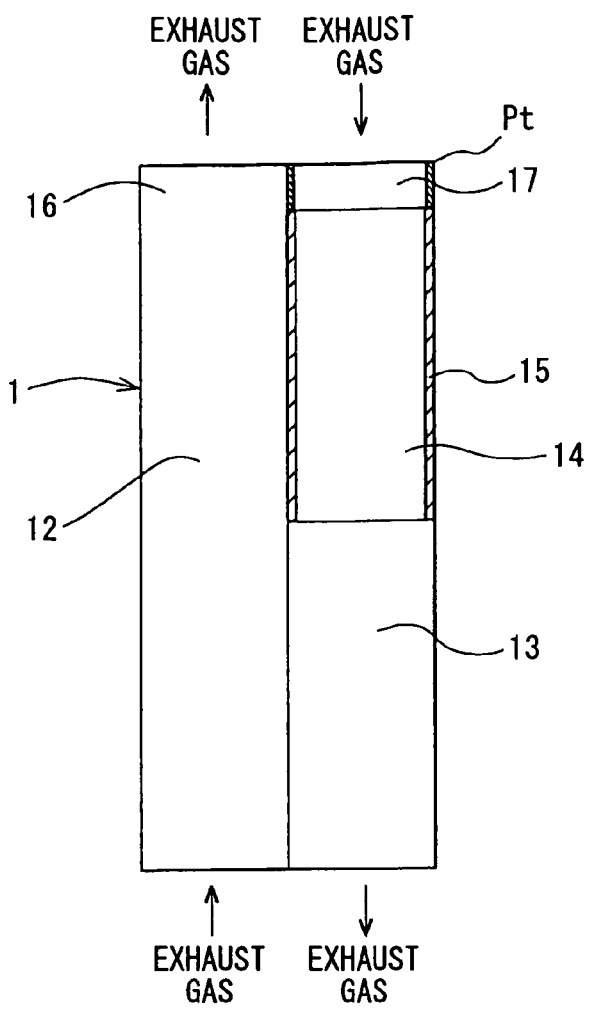
FIG. 5 is a schematic diagram showing a longitudinal cross-section of the heat exchanger of the nitrogen oxides purification device according to the example embodiment.

A nitrogen oxides purification device of the present embodiment has a structure shown in FIGS. 1 to 4. FIG. 1 is a perspective view showing the nitrogen oxides purification device. FIG. 2 is a schematic diagram showing the structure of the nitrogen oxides purification device. FIG. 3 is a cross-sectional diagram showing a heat exchanger of FIG. 1 taken along the line III-III. FIG. 4 is a cross-sectional diagram showing the heat exchanger of FIG. 1 taken along the line IV-IV. FIG. 5 is a schematic diagram showing a longitudinal cross-section of the heat exchanger.

The nitrogen oxides purification device of the present embodiment has a heat exchanger 1 and a combustion chamber 2.

The heat exchanger 1 is made of stainless steel as a heat-resistant metal. A profile of the heat exchanger 1 is formed substantially in the shape of a circular cylinder. The heat exchanger 1 is partitioned such that multiple cells defining exhaust gas flow passages extend in an axial direction. For example, the heat exchanger 1 has an outer cylinder 10 substantially in the shape of a cylinder and a partition wall 11 provided inside the outer cylinder 10. The partition wall 11 defines the multiple cells. The partition wall 11 is formed substantially in the shape of waves amplified along one radial direction (vertical direction in FIG. 3 or 4) as shown in the cross-sectional shape in FIG. 3 or 4.

The multiple cells formed in the heat exchanger 1 are grouped into an upstream flow passage 12, through which the exhaust gas flows from the back toward the front of FIG. 3 or 4, and a downstream flow passage 13, through which the exhaust gas flows from the front to the back of FIG. 3 or 4. The heat exchanger 1 is provided such that the upstream flow passage 12 and the downstream flow passage 13 are adjacent to each other.

A casing 20 is located on an end 16 (end on the front side of the cross-section shown in FIG. 3 or 4) of the heat exchanger 1. The casing 20 provides the combustion chamber 2 communicating with the respective flow passages 12, 13, 14. An injection nozzle 21 for injecting the fuel into the combustion chamber is attached to the casing 20. The injection nozzle 21 regulates a quantity of the fuel injected into the combustion chamber 2. A platinum support 17 supporting platinum is formed on a surface of the downstream flow passage 13 of the heat exchanger 1 near the end 16, or upstream of a nitrogen oxides purification catalyst section 14 and downstream of the injection nozzle 21 as shown in FIG. 5.

The nitrogen oxides purification catalyst section 14 is formed upstream of the downstream flow passage 13 of the heat exchanger 1. The nitrogen oxides purification catalyst section 14 extends across half an axial length of the heat exchanger 1. The nitrogen oxides purification catalyst section 14 has a catalyst layer 15 formed by supporting silver on a porous support layer, which is formed by coating the surface of the partition wall 11 in the downstream flow passage 13 with alumina slurry and by sintering the alumina slurry.

Next, an operation of the nitrogen oxides purification device according to the present embodiment will be explained based on an operation in the case where the purification of the exhaust gas of the diesel engine 3 is performed.

Figure 6:
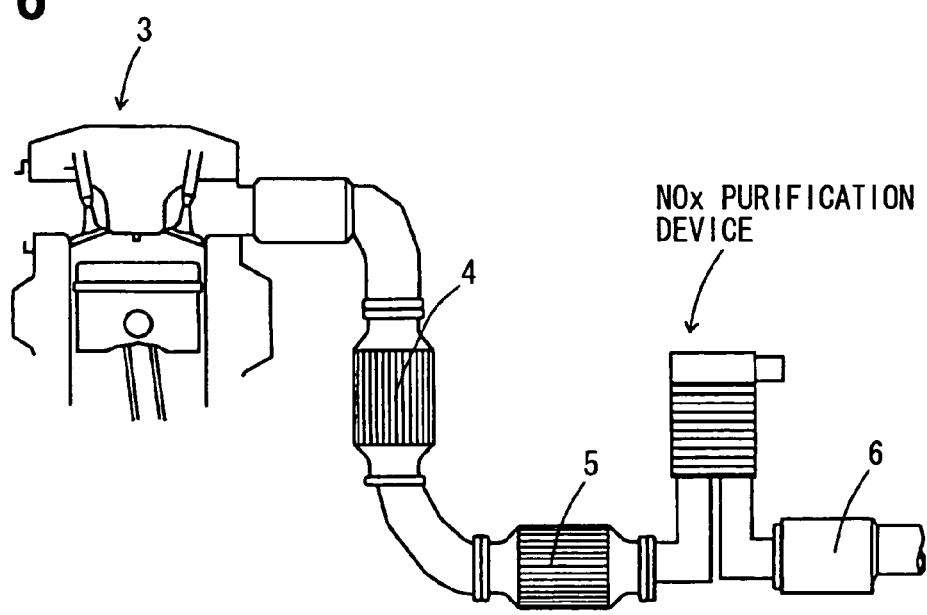
FIG. 6 is a structural diagram showing a state in which the nitrogen oxides purification device according to the example embodiment is mounted to an exhaust system of a diesel engine.

The nitrogen oxides purification device of the present embodiment is located in an exhaust system of the diesel engine 3. For example, a diesel particulate filter (DPF) 4, an oxidation catalyst 5, the nitrogen oxides purification device of the present embodiment, and a muffler 6 are arranged in the exhaust system of the diesel engine 3 in that order from the upstream side. The arrangement of the devices is shown in FIG. 6.

Conventional and known DPF and oxidation catalyst are used as the DPF 4 and the oxidation catalyst 5.

The nitrogen oxides purification device is connected to the exhaust system such that the upstream flow passage 12 is located on the upstream side of the exhaust gas flow. The injection nozzle 21 is connected with a fuel tank (not shown) of the diesel engine 3 and injects the fuel (diesel oil) of the diesel engine 3 into the combustion chamber.

Multiple sensors and a calculation device (not shown) are attached to the exhaust system of the diesel engine 3. The calculation device determines a state of the exhaust gas based on signals output from the multiple sensors. Members previously mounted to the vehicle may be used as the sensors and the calculation device. The calculation device is also connected with the injection nozzle 21 of the nitrogen oxides purification device and controls the fuel injection of the injection nozzle 21 into the combustion chamber 2.

If the diesel engine 3 equipped with the nitrogen oxides purification device is operated, exhaust gas containing carbon monoxide, hydrocarbon, nitrogen oxides and particulate matters is generated. The exhaust gas discharged from the diesel engine 3 flows through the DPF 4, first. When the exhaust gas passes through cell walls, in which continuous and minute pores open, the DPF 4 traps and eliminates the particulate matters from the exhaust gas.

After the particulate matters are eliminated from the exhaust gas at the DFP 4, the carbon monoxide and the hydrocarbon contained in the exhaust gas are decomposed and purified at the oxidation catalyst 5. Thus, the carbon monoxide and the hydrocarbon in the exhaust gas are decomposed.

The exhaust gas, in which the carbon monoxide and the hydrocarbon are decomposed at the oxidation catalyst 5, flows into the nitrogen oxides purification device. The exhaust gas passes through the upstream flow passage 12 of the nitrogen oxides purification device and flows into the combustion chamber 2. The injection nozzle 21 injects the fuel to mix the fuel into the exhaust gas in the combustion chamber 2. The exhaust gas mixed with the fuel flows from the combustion chamber 2 into the downstream flow passage 13 including the nitrogen oxides purification catalyst section 14.

The platinum support section 17 supporting the platinum is provided near the upstream end 16 of the downstream flow passage 13. Therefore, the fuel mixed in the exhaust gas is oxidized and decomposed by the platinum. The oxidation reaction of the fuel is an exothermic reaction. Therefore, the heat amount is generated at the same time, and the temperature of the exhaust gas is increased.

The heated exhaust gas reaches the nitrogen oxides purification catalyst section 14 located in the upstream portion of the downstream flow passage 13. The heated exhaust gas heats the catalyst layer 15 over activation temperature of the catalytic metal that reduces the nitrogen oxides. Thus, the nitrogen oxides contained in the exhaust gas are reduced and purified when the fuel is input. Thus, the harmful components contained in the exhaust gas are decomposed and purified.

In the nitrogen oxides purification device of the present embodiment, the nitrogen oxides purification catalyst section 14 for purifying the nitrogen oxides is formed in the heat exchanger. The high heat of the heated nitrogen oxides purification catalyst section 14 is transferred through the partition wall 11 defining the cells to heat the exhaust gas flowing through the upstream flow passage 12.

The heat is transferred also through another portion of the downstream flow passage 13, on which the catalyst layer 15 is not formed, to heat the exhaust gas flowing through the upstream flow passage 12. The partition wall 11 having good thermal conductivity is exposed at the portion of the downstream flow passage 13, on which the catalyst layer 15 is not formed. Thus, the exhaust gas flowing through the upstream flow passage 12 can be heated efficiently.

Thereafter, the exhaust gas discharged from the nitrogen oxides purification device is discharged to the atmosphere through the muffler 6.

In the exhaust system of the diesel engine 3 of the present embodiment, the sensing results of the sensors are transmitted to the calculation device, and the calculation device determines the condition of the exhaust gas flowing into the combustion chamber 2. If the calculation device determines that the exhaust gas flowing through the upstream flow passage 12 is heated by the heat in the downstream flow passage 13 and the high-temperature exhaust gas is flowing into the combustion chamber 2, the quantity of the fuel injected from the injection nozzle 21 is reduced to decrease the heat generation amount provided by the fuel. Moreover, if it is determined that the exhaust gas flowing into the nitrogen oxides purification device of the present embodiment is heated sufficiently, only the fuel necessary to purify the nitrogen oxides may be injected from the injection nozzle 21. Thus, the fuel injection quantity can be reduced significantly compared to the conventional nitrogen oxides purification device. As a result, the quantity of the fuel of the diesel engine 3 used for the purification of the nitrogen oxides can be reduced. Thus, the fuel consumption can be improved as a whole including the diesel engine 3.

In the present embodiment, the nitrogen oxides purification device is located downstream of the DPF 4 and the oxidation catalyst 5 in the exhaust system of the diesel engine 3. The arrangement of the nitrogen oxides purification device, the oxidation catalyst 5 and the DPF 4 is not limited to that of the present embodiment. The nitrogen oxides purification device may be located on the uppermost stream side, or the DPF may be located on the lowermost stream side.

In the heat exchanger of the nitrogen oxides purification device of the present embodiment, each cell defined by the partition wall has a substantially rectangular cross-section. The shape of the cross-section of each cell is not limited specifically in the nitrogen oxides purification device of the present invention.

The present invention should not be limited to the disclosed embodiment, but may be implemented in many other ways without departing from the spirit of the invention.

What is claimed is:

1. A nitrogen oxides purification device comprising:
   an exhaust gas heating section having a fuel injection device for injecting fuel into exhaust gas containing nitrogen oxides and a catalytic metal located downstream of a position, where the fuel injection device injects the fuel, for oxidizing and decomposing the fuel; and
   a nitrogen oxides purification section having a nitrogen oxides purification catalyst located downstream of the exhaust gas heating section for purifying the nitrogen oxides, wherein
   the nitrogen oxides purification device is provided in a heat exchanger having a downstream exhaust gas flow passage, which is located downstream of the nitrogen oxides purification section such that the exhaust gas heated at the exhaust gas heating section flows through the downstream exhaust gas flow passage, and an upstream exhaust gas flow passage, which is located upstream of the exhaust gas heating section such that the exhaust gas to be heated at the exhaust gas heating section flows through the upstream exhaust gas flow passage, the heat exchanger structured such that heat is transferred between the downstream exhaust gas flow passage and the upstream exhaust gas flow passage,
   the heat exchanger is provided with a common partition wall defining multiple downstream cells providing the downstream exhaust gas flow passage and multiple upstream cells providing the upstream exhaust gas flow passage such that each downstream cell is adjacent to at least one upstream cell across said common partition wall, and
   the downstream exhaust gas flow passage and the upstream exhaust gas flow passage to share said common partition wall and exchange heat directly therebetween via said common partition wall.

2. The nitrogen oxides purification device as in claim 1, wherein the fuel injected by the injection device is fuel of an internal combustion engine.

3. The nitrogen oxides purification device as in claim 1, wherein the heat exchanger includes the nitrogen oxides purification section.

4. The nitrogen oxides purification device as in claim 1, wherein said common partition wall is a single, continuous wall.

* * * * *